No. 887,142. PATENTED MAY 12, 1908.
G. S. STEVENSON.
WATER WHEEL.
APPLICATION FILED SEPT. 7, 1907.

2 SHEETS—SHEET 1.

WITNESSES

INVENTOR

No. 887,142. PATENTED MAY 12, 1908.
G. S. STEVENSON.
WATER WHEEL.
APPLICATION FILED SEPT. 7, 1907.

2 SHEETS—SHEET 2.

WITNESSES

INVENTOR
George Seaton Stevenson

ATTY.

UNITED STATES PATENT OFFICE.

GEORGE SEATOR STEVENSON, OF DUNEDIN, NEW ZEALAND.

WATER-WHEEL.

No. 887,142.  Specification of Letters Patent.  Patented May 12, 1908.

Application filed September 7, 1907. Serial No. 391,818.

*To all whom it may concern:*

Be it known that I, GEORGE SEATOR STEVENSON, a subject of the King of Great Britain, of 5 Commercial Chambers, 24 Manse street, Dunedin, New Zealand, contractor, have invented certain new and useful Improvements in Water-Wheels, of which the following is a specification.

My invention relates to current operated water-wheels, used in rivers, streams, and the like for obtaining power for driving purposes.

The objects of my invention are, to provide means for automatically raising or lowering the water-wheel in accordance with a rise or fall in the level of the water so that the waterwheel may be automatically kept at the proper height for most efficient working, and to provide means for raising the water-wheel out of operation when desired.

Figure 1:
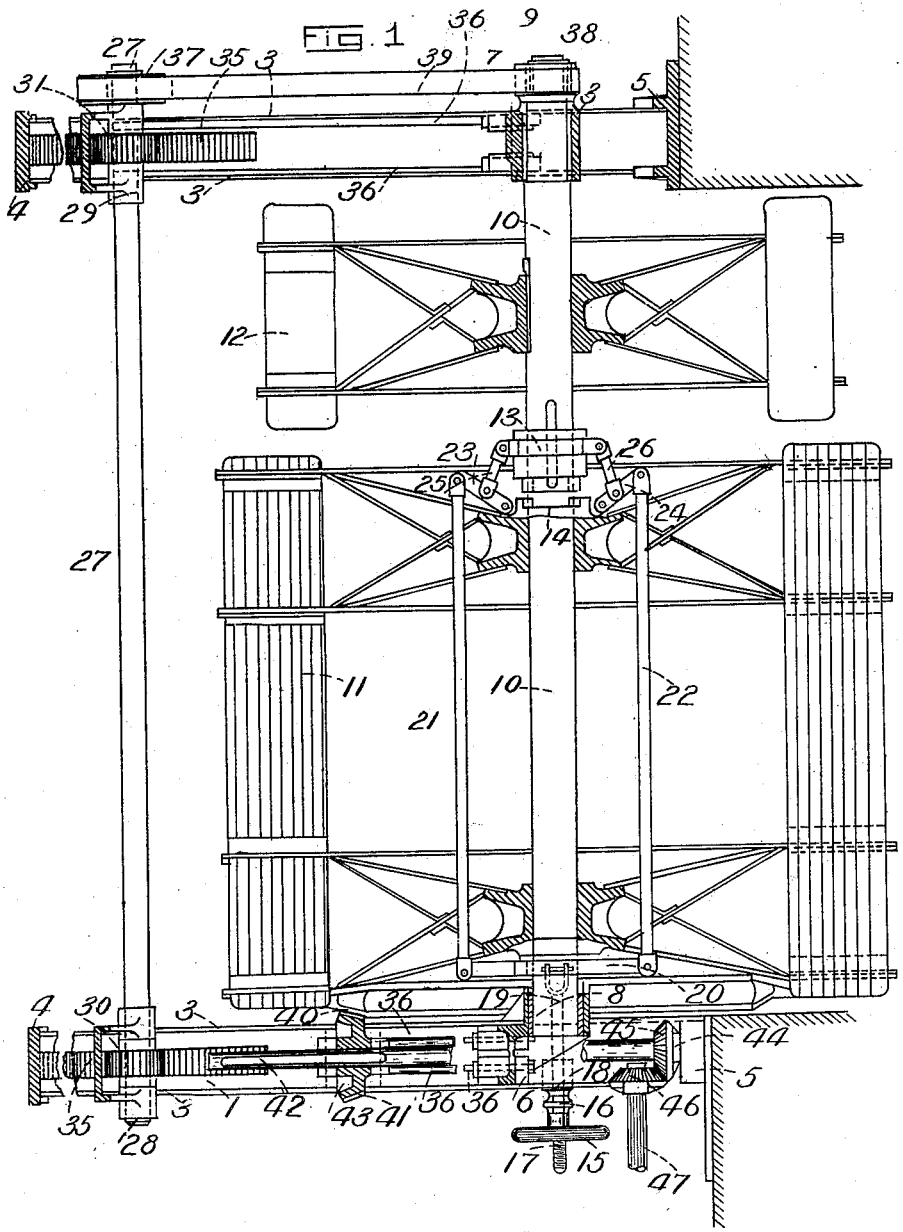
Figure 2:
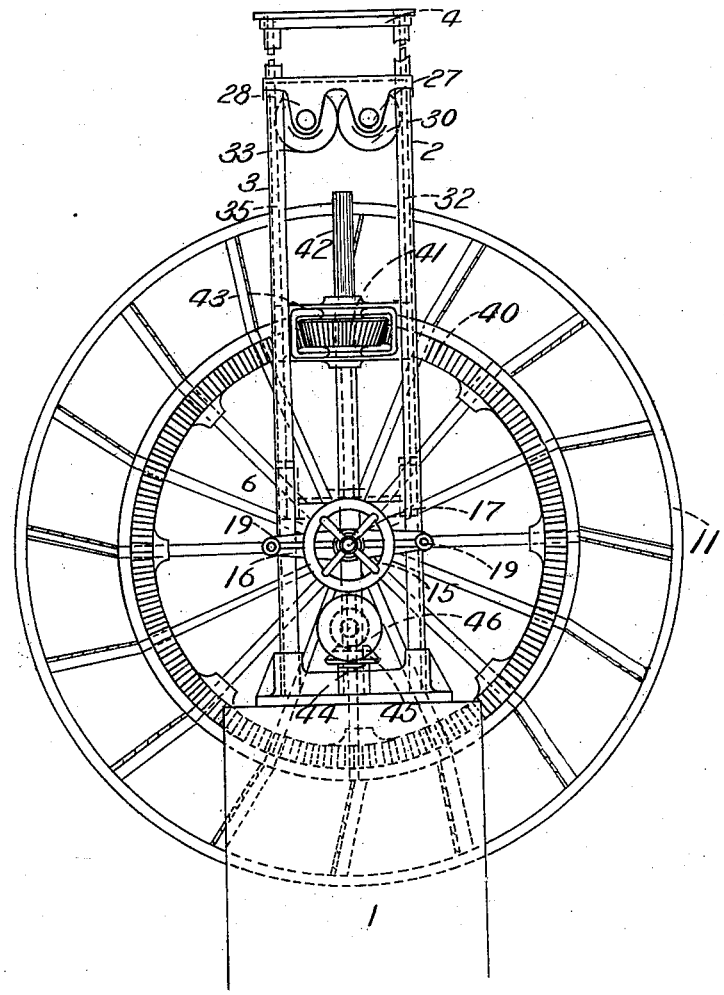

My invention is illustrated in the accompanying drawings in which the same numerals of reference indicate the same parts, and Figure 1 is a side view of my invention. Fig. 2 is an end view of the same.

According to my invention there are two pillars (1) (1) erected on foundations on the banks or in the current, each pillar consisting of two vertical channel irons (2) (3) connected at their upper ends by caps (4) and fitted at their lower ends in bedplates (5). Between the channel irons (2) (3) are fitted sliding brackets (6) (7) to which are secured the bearings (8) (9) of the main horizontal shaft (10). The large power waterwheel (11) runs loose on the shaft (10) and beside it but keyed to the shaft (10) is a smaller adjusting water-wheel (12). Between the water-wheels (11) (12) is a clutch (13) mounted on the shaft (10) and adapted to engage a mating part on the adjacent boss (14) of the large water-wheel (11). The clutch is operated by means of the handwheel (15) which is mounted on a bracket (16) and works on a screw (17) secured to a bracket (18) sliding on the channel irons (2) (3). The ends of the bracket (16) are attached to rods (19) connected to the clutch (13) by the band (20) connecting rods (21) (22) levers (23) (24) and links (25) (26) so that the operation of the hand-wheel (15) puts the clutch in or out of gear with the boss (14) of the large water-wheel (11). When the clutch is in gear with the boss (14) the large water-wheel (11) is fixed on the shaft (10) and revolves therewith. Between the upper ends of the two pillars (1) is mounted a second horizontal shaft (27) journaled in brackets (28) (29) which slide on the channel irons (2) (3). This shaft (27) carries at its ends pinions (30) (31) engaging with racks (32) secured within the channel irons (2) (2) near their upper ends and with other pinions (33) also mounted in the brackets (28) (29). These pinions (33) (one of which is shown in Fig. 2) also engages racks (35) secured within the other channel irons (3) (3) near their upper ends. The lower sliding brackets (6) (7) are connected to the upper sliding brackets (28) (29) by vertical rods (36) see Fig. 1. The upper horizontal shaft (27) carries at one end a large sprocket wheel (37), and the main horizontal shaft (10) carries at one end a smaller sprocket wheel (38), these sprocket wheels (37) (38) being connected by a chain (29). Secured round one rim of the large water-wheel (11) is a bevel wheel (40) gearing with a bevel pinion (41) feathered on a vertical shaft (42) which is journaled in a bracket (43) sliding in the channel irons (2) (3) and a foot step bearing (44) secured to the bedplate (5). The lower end of the shaft (42) carries a bevel pinion (45) gearing with another pinion (46) mounted on a horizontal shaft (47) by which the power is transmitted as desired.

The operation of the invention is as follows. When the water is at its normal level it revolves the large water-wheel (11) to transmit the power, but as the large water-wheel (11) is loose on the shaft (1) the latter does not revolve. When, however, either the level of the water rises, or the shaft (10) and its attachments descend by gravity until the water operates the small waterwheel (12), the latter revolves the shaft (10), thereby revolving the shaft (27) by means of the sprocket wheels (37) (38) and chain (39). The pinions (30) (31) (33) which engage the racks (32) (35) on the pillars (1) are thereby also revolved and raise the shaft (27) with its attachments and the shaft (10) with its attachments until the small water wheel (12) is clear of the water, whereupon it, with the shaft (10), ceases to revolve, but the large water wheel (11) is still revolved to transmit the power. The depth to which the floats of the large water wheel (11) become immersed is thus equal to the difference between the diameters of the waterwheels (11) and (12). By the operation of the clutch (13) the large water-wheel may be fixed on the shaft (10) and it is thereupon automatically raised till clear of the water.

Having now described my invention, what I claim as new and desire to secure by Letters Patent is:—

1. In combination with a power motor wheel and its shaft, a smaller adjusting water-wheel mounted on the main shaft beside the power water-wheel, and mechanism whereby when the water revolves the adjusting water-wheel the shaft with its attachments rises until the adjusting water-wheel is clear of the water, substantially as and for the purposes set forth.

2. Improvements in water-wheels comprising vertical supporting pillars, a main horizontal shaft sliding on said pillars, a power water-wheel running loose on said main shaft, a smaller water-wheel keyed on said main shaft, an upper horizontal shaft journaled in brackets sliding on said pillars, rods connecting said upper and main shafts, racks on the upper ends of said pillars, pinions on said upper shaft engaging the racks on one side of the pillars and other pinions which are mounted in said brackets and which engage the racks on the other side of the pillars, and means for transmitting motion from said main shaft to said upper shaft substantially as described.

3. Improvements in water wheels comprising vertical supporting pillars, a main horizontal shaft sliding on said pillars, a power water-wheel running loose on said main shaft, a smaller water-wheel keyed on said main shaft, an upper horizontal shaft journaled in brackets sliding on said pillars, rods connecting said upper and main shafts, racks on the upper ends of said pillars, pinions on said upper shaft engaging the racks on one side of the pillars and other pinions which are mounted in said brackets and which engage the racks on the other side of the pillars, means for transmitting motion from said main shaft to said upper shaft, and a clutch for fixing said power water-wheel on said main shaft when desired, substantially as described.

4. Improvements in water-wheels comprising two vertical supporting pillars, brackets sliding on said pillars, a main shaft journaled in bearings attached to said brackets, a power water-wheel running loose on said main shaft, a smaller water wheel keyed on said main shaft, upper brackets sliding on said pillars, a horizontal shaft journaled in said upper brackets pinions on the ends of said upper horizontal shaft, pinions mounted on said upper brackets engaging the pinions on said horizontal shaft, racks on the upper ends of said pillars engaging said pinions on said upper brackets and horizontal shaft respectively, rods connecting the brackets, of the two shafts, sprocket wheels on the two shafts and a chain connecting said sprocket wheels substantially as described.

5. Improvements in water-wheels comprising two vertical supporting pillars, brackets sliding on said pillars, a main shaft journaled in bearings attached to said brackets, a power water-wheel running loose on said main shaft, a smaller water wheel keyed on said main shaft, upper brackets sliding on said pillars, a horizontal shaft journaled in said upper brackets, pinions on the ends of said upper horizontal shaft, pinions mounted on said upper brackets engaging the pinions on said horizontal shaft, racks on the upper ends of said pillars engaging said pinions on said upper brackets and horizontal shaft respectively, rods connecting the brackets of the two shafts, sprocket wheels on the two shafts a chain connecting said sprocket wheels and a clutch for fixing said power water-wheel on said main shaft when desired substantially as described.

In witness whereof I have hereunto set my hand in presence of two witnesses.

GEORGE SEATOR STEVENSON.

Witnesses:
ANDREW JOHN PARK,
JOHN RUTHERFORD PARK.